United States Patent
Chen et al.

(10) Patent No.: US 10,715,040 B1
(45) Date of Patent: Jul. 14, 2020

(54) VOLTAGE COMPENSATION CIRCUIT AND VOLTAGE COMPENSATION METHOD

(71) Applicant: Chicony Power Technology Co., Ltd., New Taipei (TW)

(72) Inventors: Wei-Yuan Chen, New Taipei (TW); Yu-Chen Liu, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 16/503,502

(22) Filed: Jul. 4, 2019

(30) Foreign Application Priority Data

May 22, 2019 (TW) .............................. 108117718 A

(51) Int. Cl.
*H02M 3/156* (2006.01)
*H02M 1/00* (2006.01)

(52) U.S. Cl.
CPC .... *H02M 3/156* (2013.01); *H02M 2001/0009* (2013.01); *H02M 2001/0019* (2013.01); *H02M 2001/0025* (2013.01)

(58) Field of Classification Search
CPC ................. H02M 3/158; H02M 1/088; H02M 2001/0009; H02M 3/156; H02M 2001/0019; H02M 2001/0025; H03K 5/24
See application file for complete search history.

(56) References Cited

U.S. PATENT DOCUMENTS

| | | | |
|---|---|---|---|
| 4,460,873 A | 7/1984 | Hester | |
| 4,890,014 A | 12/1989 | Ramet | |
| 9,490,714 B1 | 11/2016 | Nishijima | |
| 9,806,619 B2 | 10/2017 | Wu et al. | |
| 2002/0130710 A1* | 9/2002 | Mahrla | G05F 1/575 327/540 |
| 2005/0002134 A1* | 1/2005 | Ohtake | H02M 3/156 361/18 |
| 2013/0307511 A1* | 11/2013 | De Vries | G01R 19/0092 323/284 |
| 2019/0050008 A1 | 2/2019 | Nakashima | |

FOREIGN PATENT DOCUMENTS

| | | |
|---|---|---|
| CN | 106559002 | 4/2017 |
| CN | 108153364 | 6/2018 |
| CN | 109460104 | 3/2019 |
| CN | 109656301 | 4/2019 |
| JP | 2015005171 | 1/2015 |
| TW | 201503563 | 1/2015 |
| TW | I489760 | 6/2015 |
| TW | 201622323 | 6/2016 |
| TW | 201710818 | 3/2017 |
| TW | 201818182 | 5/2018 |
| TW | 201824718 | 7/2018 |

* cited by examiner

*Primary Examiner* — Jue Zhang
(74) *Attorney, Agent, or Firm* — JCIPRNET

(57) ABSTRACT

A voltage compensation circuit and a voltage compensation method are provided. The voltage compensation circuit detects the load current provided by a power supply, generates a load voltage according to the load current, and compares the load voltage with at least one reference voltage to generate a switch control signal. The voltage compensation circuit further drives the at least one switch according to the switch control signal, provides a compensation resistance value according to the at least one switch that is turned on, and provides a compensation voltage to the power supply, so that the power supply provides a precise output voltage.

13 Claims, 5 Drawing Sheets

VOLTAGE COMPENSATION CIRCUIT AND VOLTAGE COMPENSATION METHOD

CROSS-REFERENCE TO RELATED APPLICATION

This application claims the priority benefit of Taiwan application serial no. 108117718, filed on May 22, 2019. The entirety of the above-mentioned patent application is hereby incorporated by reference herein and made a part of this specification.

BACKGROUND

Technical Field

The invention relates to a voltage compensation circuit and a voltage compensation method, and particularly relates to a voltage compensation circuit and a voltage compensation method capable of improving supply precision of an output voltage.

Description of Related Art

A power supply may supply an output power to a load. When the load changes or a demand of the load for power increases, a voltage value of the output power decreases. Especially when the load has a greater demand for power, reduction of the output voltage will be greater. Generally, a current improvement method is to sense a feedback result of a change of the output power of the load side, such that the power supply compensates the output power according to the feedback result returned by the load side, so as to to compensate a transmission loss between the power supply and the load, where the transmission loss is, for example, a voltage value of the output voltage decreased due to a power loss caused by a power transmission line or additional output components.

However, the aforementioned improvement method may lead to misjudgement of the power supply due to instability of the feedback of the load side, which may lead to error or inaccurate compensation of the output voltage.

SUMMARY

The invention is directed to a voltage compensation circuit and a voltage compensation method, which is configured to improve accuracy of an output voltage.

The invention provides a voltage compensation circuit adapted to compensate a voltage value of an output power of a power supply. The voltage compensation circuit includes a current detection unit, a voltage conversion unit, a voltage comparison unit, a control circuit and a voltage compensation unit. The current detection unit is configured to detect a load current provided by the power supply. The voltage conversion unit is coupled to the current detection unit. The voltage conversion unit is configured to generate a load voltage according to the load current. The voltage comparison unit is coupled to the voltage conversion unit. The voltage comparison unit is configured to compare the load voltage with at least one reference voltage to generate a switch control signal. The control circuit is coupled to the voltage comparison unit. The control circuit includes at least one switch. The control circuit is configured to drive the at least one switch according to the switch control signal. The voltage compensation unit is coupled to the control circuit. The voltage compensation unit is configured to provide a compensation resistance value according to the at least one switch that is turned on. The voltage compensation unit provides a compensation voltage to the power supply according to the compensation resistance value.

The invention provides a voltage compensation method adapted to compensate a voltage value of an output power of a power supply. The voltage compensation method includes: detecting a load current provided by the power supply; generating a load voltage according to the load current; comparing the load voltage with at least one reference voltage to generate a switch control signal; providing at least one switch, and driving the at least one switch according to the switch control signal; and providing a compensation resistance value according to the at least one switch that is turned on, and providing a compensation voltage to the power supply according to the compensation resistance value.

Based on the above description, the voltage compensation circuit and the voltage compensation method of the invention detect the load current provided by the power supply to generate the switch control signal, and drive the at least one switch according to the switch control signal, and provide the compensation resistance value according to the at least one switch that is turned on. Therefore, the voltage compensation circuit and the voltage compensation method of the invention provide the compensation voltage to the power supply according to the compensation resistance value. The power supply may provide accurate compensation to the output voltage according to the compensation voltage.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
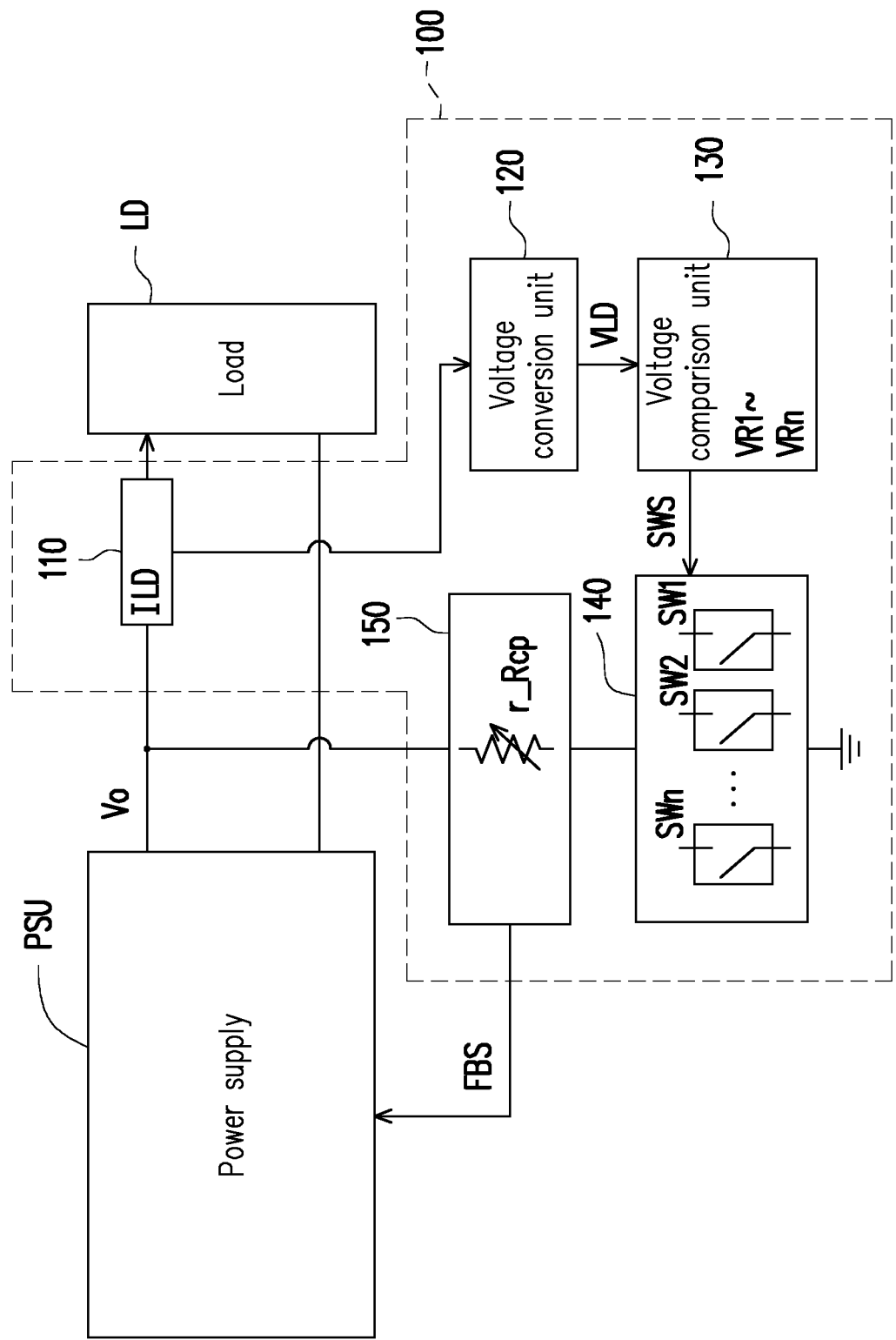
FIG. 1 is a schematic diagram of a voltage compensation circuit according to an embodiment of the invention.

Referring to FIG. 1, FIG. 1 is a schematic diagram of a voltage compensation circuit according to an embodiment of the invention. In the embodiment, the voltage compensation circuit 100 is adapted to compensate a voltage value of an output power Vo of a power supply PSU. The voltage compensation circuit 100 includes a current detection unit 110, a voltage conversion unit 120, a voltage comparison unit 130, a control circuit 140 and a voltage compensation unit 150. The current detection unit 110 detects a load current ILD provided by the power supply PSU. The current detection unit 110 is disposed on a power transmission line between the power supply PSU and a load LD. The current detection unit 110 may also be disposed on a power transmission line in internal of the power supply PSU.

In the embodiment, the current detection unit 110 may be a circuit at least including a detection inductor (not shown). The detection inductor and the power transmission line are connected in series between the power supply PSU and the load LD. The current detection unit 110 may provide a detection result of the load current ILD through the detection inductor. The power supply PSU provides the output power Vo to the load LD through the detection inductor. When a current value of the output power Vo flows through the detection inductor, the detection inductor provides a load differential signal pair corresponding to the load current ILD. For example, a first terminal of the detection inductor used for coupling the power supply PSU may provide a first differential signal in the load differential signal pair. A second terminal of the detection inductor used for coupling the load LD may provide a second differential signal in the load differential signal pair.

In some embodiments, the current detection unit 110 may be a circuit at least including a detection resistor. The current detection unit 110 may provide a detection result of the load current ILD through the detection resistor.

In the embodiment, the voltage conversion unit 120 is coupled to the current detection unit 110. The voltage conversion unit 120 receives the detection result of the load current ILD, and generates a load voltage VLD according to the load current ILD. The voltage comparison unit 130 is coupled to the voltage conversion unit 120. The voltage comparison unit 130 receives the load voltage VLD. The voltage comparison unit 130 compares the load voltage VLD with reference voltages VR1-VRn to generate a switch control signal SWS. The switch control signal SWS may be a multi-bit control signal group. In the embodiment, voltage values of the reference voltages VR1-VRn are different.

In the embodiment, the control circuit 140 is coupled to the voltage comparison unit 130. The control circuit includes switches SW1-SWn. The control circuit 140 may receive the switch control signal SWS provided by the voltage comparison unit 130, and drive the switches SW1-SWn according to the switch control signal SWS. The switch control signal SWS drives the switches SW1-SWn to turn on or turn off. The voltage compensation unit 150 is coupled to the control circuit 140. The voltage compensation unit 150 provides a compensation resistance value r_Rcp according to the turned on switches in the switches SW1-SWn. The power supply PSU compensates a voltage value of the output power Vo according to the compensation resistance value r_Rcp. In detail, in the embodiment, the voltage compensation unit 150 generates a compensation voltage FBS according to the compensation resistance value r_Rcp, and provides the compensation voltage FBS to the power supply PSU. The power supply PSU compensates the voltage value of the output power Vo according to the compensation voltage FBS.

In the embodiment, the power supply PSU may provide an auxiliary voltage to the voltage compensation unit 150. The voltage compensation unit 150 converts the auxiliary voltage into the compensation voltage FBS according to the compensation resistance value r_Rcp, and provides the compensation voltage FBS to the power supply PSU. The power supply PSU compensates the voltage value of the output power Vo according to the compensation voltage FBS. In some embodiments, the auxiliary voltage may also be provided by the voltage compensation circuit 100 itself.

For simplicity's sake, in the embodiment, the reference voltages VR1-VRn and the switches SW1-SWn are taken as an example for description. The number of the reference voltages, the number of the switch control signals and the number of the switches may be one or plural, which is not limited by the invention.

It should be noted that the voltage compensation circuit 100 detects the load current ILD provided by the power supply PSU to generate the switch control signal SWS, and drives the switches SW1-SWn according to the switch control signal SWS, and provides the compensation resistance value r_Rcp according to the turned on switches. The voltage compensation circuit 100 provides the compensation voltage FBS to the power supply PSU according to the compensation resistance value r_Rcp. Moreover, the voltage compensation circuit 100 detects the load current ILD provided by the power supply PSU on the power transmission line. Namely, the voltage compensation circuit 100 may dynamically adjust the compensation voltage FBS according to the load current ILD of the power transmission line. In this way, the power supply PSU may provide precise compensation to the output power Vo according to the compensation voltage FBS. Compared to the existing improvement method, in the embodiment, the load current ILD between the power supply and the load may be detected. When the load LD has a greater demand for power, the embodiment can precisely compensate the transmission loss between the power supply PSU and the load LD according to the load current ILD, such that the power supply PSU may provide precise output power Vo to avoid wrong or inaccurate compensation caused by instability of the feedback of the load side.

Figure 2:
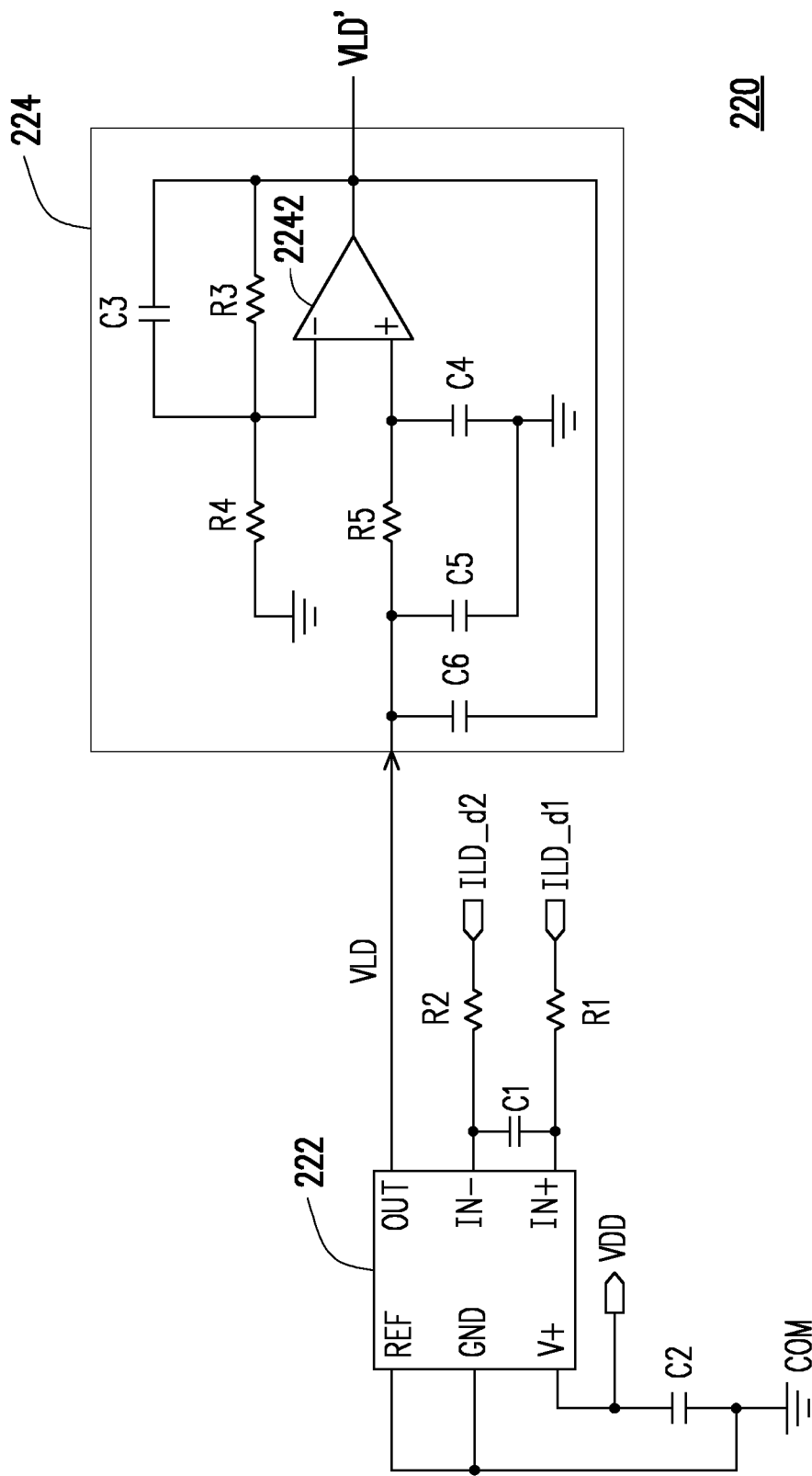
FIG. 2 is a schematic diagram of a voltage conversion unit according to an embodiment of the invention.

Further, referring to FIG. 1 and FIG. 2, FIG. 2 is a schematic diagram of a voltage conversion unit according to an embodiment of the invention. In the embodiment, the voltage conversion unit 220 is adapted to receive the detection result provided by the current detection unit 110 in the voltage compensation circuit 100.

In the embodiment, the current detection unit 110 is, for example, a circuit at least including a detection inductor. The voltage conversion unit 220 includes a differential current amplifier 222. A first input terminal IN+ of the differential current amplifier 222 is coupled to a first terminal of the detection inductor of the current detection unit 110. A second input terminal IN− of the differential current amplifier 222 is coupled to a second terminal of the detection inductor and the load LD, and the differential current amplifier 222 is configured to convert the load differential signal pair to generate the load voltage VLD. The load voltage VLD is output to the voltage comparison unit 130 of the voltage compensation circuit 100 through an output terminal OUT of the different current amplifier 222.

In detail, the first input terminal IN+ of the differential current amplifier 222 may receive a first differential signal ILD_d1 in the load differential signal pair through a resistor R1. The second input terminal IN− of the differential current amplifier 222 may receive a second differential signal ILD_d2 in the load differential signal pair through a resistor R2. A capacitor C1 may be configured between the first input terminal IN+ and the second input terminal IN− of the differential current amplifier 222, so as to maintain stability of the load differential signal pair. The differential current amplifier 222 may generate the load voltage VLD according to a difference between a voltage value of the first differential signal ILD_d1 and a voltage value of the second differential signal ILD_d2.

Moreover, the differential current amplifier 222 further has a reference terminal REF, a ground terminal GND and a power terminal V+. The reference terminal REF and the ground terminal GND of the differential current amplifier 222 are used for receiving a referential low voltage (for example, a ground potential). The power terminal V+ is used for receiving a system power VDD (for example, 12 volts). A capacitor C2 may be configured between the power terminal V+ and the reference terminal REF and the ground terminal GND.

In the embodiment, the voltage conversion unit 220 may further include a buffer 224. The buffer 224 is coupled between the output terminal OUT of the differential current amplifier 222 and the voltage comparison unit 130. The buffer 224 may receive the load voltage VLD and gain a voltage value of the load voltage VLD.

In detail, the buffer 224 includes an operational amplifier 2242, resistors R3-R5 and capacitors C3-C6. A non-inverted input terminal of the operational amplifier 2242 is coupled to the output terminal OUT of the differential current amplifier 222 through the resistor R5. A first terminal of the resistor R5 serves as an input terminal of the buffer 224. The non-inverted input terminal of the operational amplifier 2242 is configured to receive the load voltage VLD. The resistor R3 is coupled between an output terminal and an inverted input terminal of the operational amplifier 2242. The resistor R4 is coupled between the inverted input terminal of the operational amplifier 2242 and the referential low voltage. The capacitor C3 and the resistor R3 are connected in parallel. The capacitor C4 is coupled between the non-inverted input terminal of the operational amplifier 2242 and the referential low voltage. The capacitor C5 is coupled between the input terminal of the buffer 224 (i.e. the first terminal of the resistor R5) and the referential low voltage. The capacitor C6 is coupled between the output terminal of the operational amplifier 2242 and the input terminal of the buffer 224. The buffer 224 may gain the load voltage VLD according to a resistance value of the resistor R3 and a resistance value of the resistor R4, so as to provide a modified load voltage VLD'. The buffer 224 may stabilize the modified load voltage VLD' through the configuration of the capacitors C3-C6.

Referring back to FIG. 1, in some embodiments, the current detection unit 110 and the voltage conversion unit 120 may be implemented by a Hall effect sensor.

Figure 3:
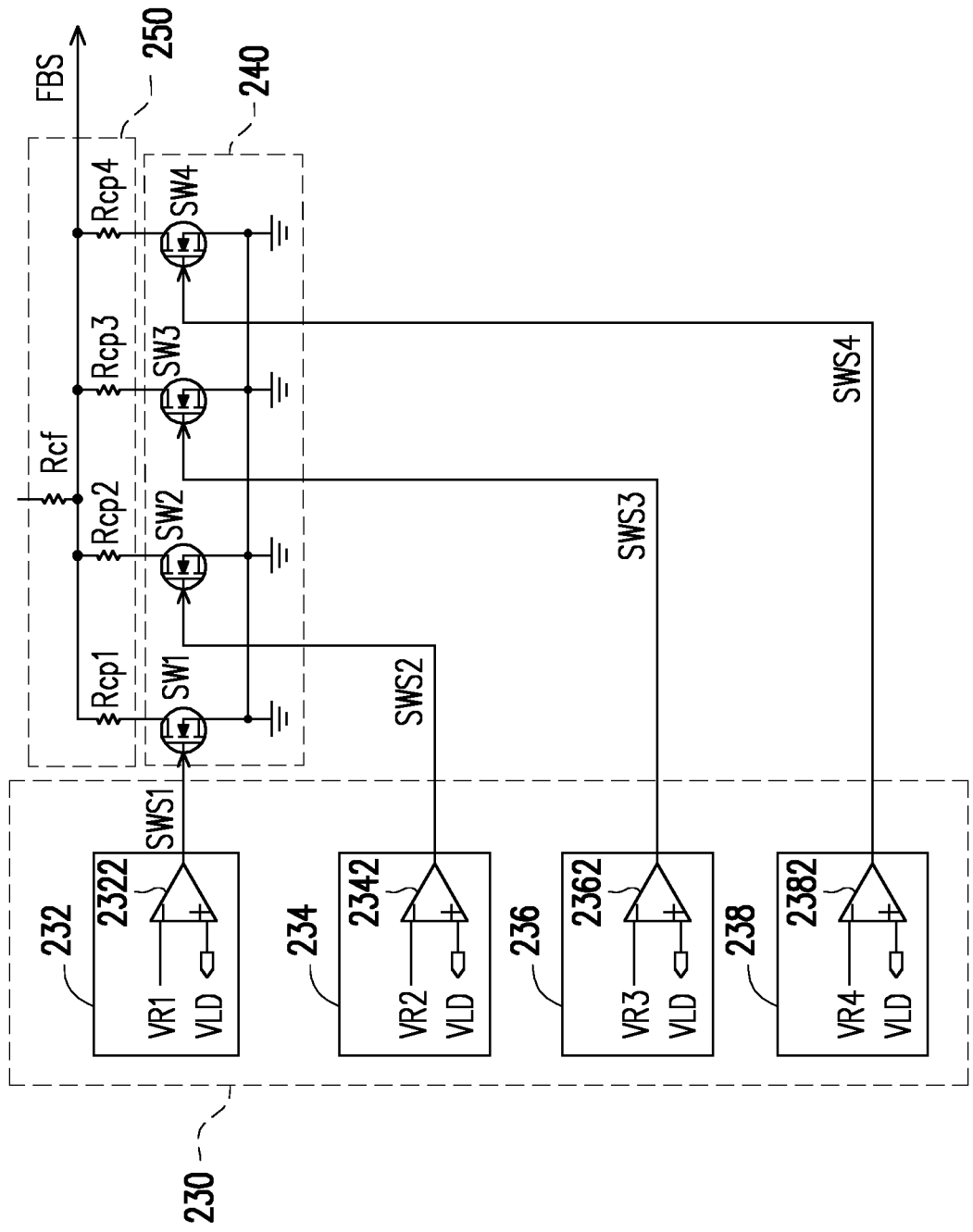
FIG. 3 is a schematic diagram of a voltage comparison unit, a control circuit and a voltage compensation unit according to an embodiment of the invention.

Referring to FIG. 1 and FIG. 3, FIG. 3 is a schematic diagram of a voltage comparison unit, a control circuit and a voltage compensation unit according to an embodiment of the invention. In the embodiment, the voltage comparison unit 230, the control circuit 240 and the voltage compensation unit 250 may be applied to the voltage compensation circuit 100. A coupling relationship of the voltage comparison unit 230, the control circuit 240 and the voltage compensation unit 250 is similar to a coupling relationship of the voltage comparison unit 130, the control circuit 140 and the voltage compensation unit 150.

In the embodiment, the voltage comparison unit 230 includes switch control signal generators 232, 234, 236 and 238. The switch control signal generators 232, 234, 236 and 238 respectively generate switch control signals SWS1-SWS4 in a control signal group (for example, the switch control signal SWS shown in FIG. 1). The switch control signals SWS1-SWS4 are respectively a single-bit control signals. In view of the switch control signal generator 232, the switch control signal generator 232 is coupled to the voltage conversion unit 120 to receive the load voltage VLD. The switch control signal generator 232 compares the load voltage VLD and a reference voltage VR1 to generate the switch control signal SWS1. In detail, the switch control signal generator 232 includes a comparator 2322. An inverted input terminal of the comparator 2322 is used for receiving the reference voltage VR1. A non-inverted input terminal of the comparator 2322 is used for receiving the load voltage VLD. When the voltage value of the load voltage VLD is greater than or equal to the reference voltage VR1, the switch control signal generator 232 generates the switch control signal SWS1 with a high voltage level. On the other hand, when the voltage value of the load voltage VLD is smaller than the reference voltage VR1, the switch control signal generator 232 generates the switch control signal SWS1 with a low voltage level.

In view of the switch control signal generator 234, the switch control signal generator 234 is coupled to the voltage conversion unit 120 to receive the load voltage VLD. The switch control signal generator 234 compares the load voltage VLD and a reference voltage VR2 to generate the switch control signal SWS2. The switch control signal generator 234 includes a comparator 2342. An inverted input terminal of the comparator 2342 is used for receiving the reference voltage VR2. A non-inverted input terminal of the comparator 2342 is used for receiving the load voltage VLD. When the voltage value of the load voltage VLD is greater than or equal to the reference voltage VR2, the switch control signal generator 234 generates the switch control signal SWS2 with the high voltage level. On the other hand, when the voltage value of the load voltage VLD is smaller than the reference voltage VR2, the switch control signal generator 234 generates the switch control signal SWS2 with the low voltage level.

The switch control signal generator 236 is coupled to the voltage conversion unit 120 to receive the load voltage VLD. The switch control signal generator 236 compares the load voltage VLD and a reference voltage VR3 to generate the switch control signal SWS3. The switch control signal generator 238 is coupled to the voltage conversion unit 120 to receive the load voltage VLD. The switch control signal generator 238 compares the load voltage VLD and a reference voltage VR4 to generate the switch control signal SWS4. Voltage values of the reference voltages VR1-VR4 are different to each other.

Implementation details that the switch control signal generators 236 and 238 generate the switch control signals SWS3 and SWS4, an implantation detail of the comparator 2362 of the switch control signal generator 236 and an implantation detail of the comparator 2382 of the switch control signal generator 238 may be learned from implementation details of the switch control signal generators 232 and 234, which are not repeated.

Figure 4:
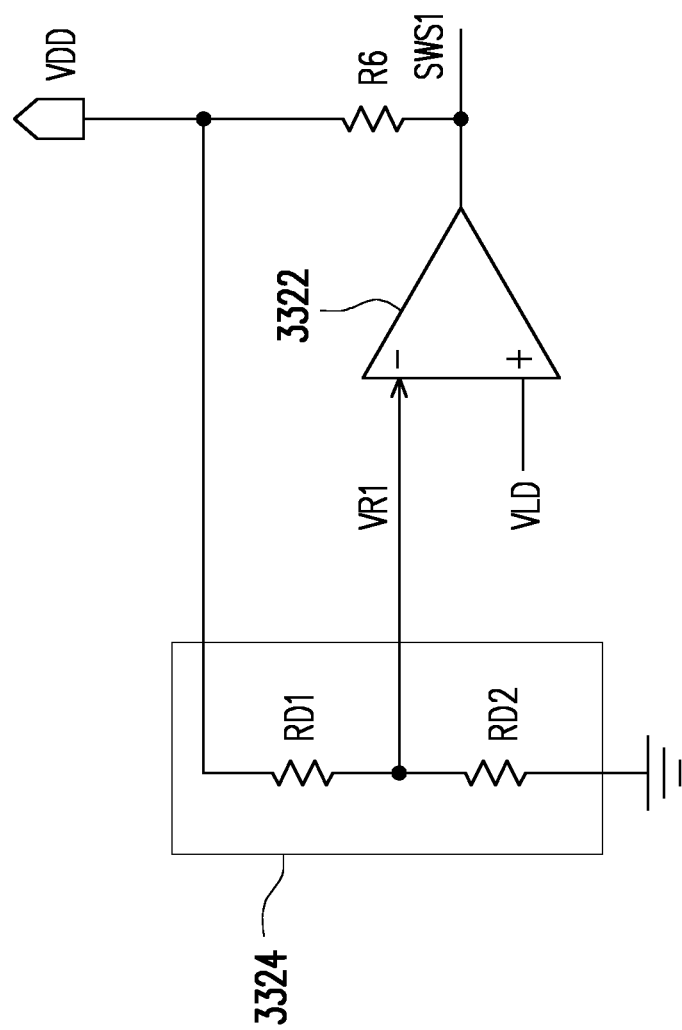
FIG. 4 is a schematic diagram of a switch control signal generator according to an embodiment of the invention.

A generation method of the reference voltages is introduced below. Referring to FIG. 4, FIG. 4 is a schematic diagram of a switch control signal generator according to an embodiment of the invention. The switch control signal generator 332 may serve as the switch control signal generator 232 of the voltage comparison unit 230 of FIG. 3. In the embodiment, the switch control signal generator 332 includes a comparator 3322 and a voltage dividing circuit 3324. The voltage dividing circuit 3324 is coupled to an inverted input terminal of the comparator 3322. The voltage dividing circuit 3324 is used for receiving the system power VDD (for example, 12 volts), and dividing the system power VDD to generate the reference voltage VR1. In detail, the voltage dividing circuit 3324 includes a first voltage dividing resistor RD1 and a second voltage dividing resistor RD2. A first terminal of the first voltage dividing resistor RD1 is coupled to the system power VDD. A second terminal of the first voltage dividing resistor RD1 is coupled to the inverted input terminal of the comparator 3322. A first terminal of the second voltage dividing resistor RD2 is coupled to the inverted input terminal of the comparator 3322. A second terminal of the second voltage dividing resistor RD2 is coupled to the reference low voltage. The voltage dividing circuit 3324 may divide the system power VDD to generate the reference voltage VR1 according to a resistance value of the first voltage dividing resistor RD1 and a resistance value of the second voltage dividing resistor RD2. Moreover, the switch control signal generator 332 further includes a resistor R6 coupled between an output terminal of the comparator 3322 and the system power VDD.

Referring back to the embodiment of FIG. 1 and FIG. 3, based on the instruction of the embodiment of FIG. 4, the switch control signal generators 232, 234, 236 and 238 may respectively include a voltage dividing circuit. In the plurality of voltage dividing circuit of the switch control signal generators 232, 234, 236 and 238, resistance values of each of the first voltage dividing resistors and/or resistance values of each of the second voltage dividing resistors may have different configurations, so that the voltage values of the reference voltages VR1-VR4 are different to each other.

In the embodiment of FIG. 3, the control circuit 240 includes switches SW1-SW4. The switches SW1-SW4 are implemented by N-type Metal-Oxide-Semiconductor Field-Effect Transistor (MOSFET). In the embodiment, a first terminal of the switch SW1 is coupled to the voltage compensation unit 250. A second terminal of the switch SW1 is coupled to the reference low voltage. A control terminal of the switch SW1 receives the switch control signal SWS1. A first terminal of the switch SW2 is coupled to the voltage compensation unit 250. A second terminal of the switch SW2 is coupled to the reference low voltage. A control terminal of the switch SW2 receives the switch control signal SWS2. A first terminal of the switch SW3 is coupled to the voltage compensation unit 250. A second terminal of the switch SW3 is coupled to the reference low voltage. A control terminal of the switch SW3 receives the switch control signal SWS3. A first terminal of the switch SW4 is coupled to the voltage compensation unit 250. A second terminal of the switch SW4 is coupled to the reference low voltage. A control terminal of the switch SW4 receives the switch control signal SWS4. The switch of the invention may be implemented by any type of a transistor switch or a combination thereof, which is not limited by the invention.

In the embodiment, the voltage compensation unit 250 includes compensation resistors Rcp1-Rcp4. The compensation resistors Rcp1-Rcp4 are respectively coupled to the switches SW1-SW4. In detail, first terminals of the compensation resistors Rcp1-Rcp4 are connected to each other, and a second terminal of the compensation resistor Rcp1 is coupled to the first terminal of the switch SW1. A second terminal of the compensation resistor Rcp2 is coupled to the first terminal of the switch SW2. A second terminal of the compensation resistor Rcp3 is coupled to the first terminal of the switch SW3. A second terminal of the compensation resistor Rcp4 is coupled to the first terminal of the switch SW4. Based on the above coupling method, the turned on switches in the switches SW1-SW4 may connect the corresponding compensation resistors to the reference low voltage, such that the compensation resistors connected to the reference low voltage are connected in parallel to provide a compensation resistance value r_Rcp. Therefore, the more the compensation resistors connected to the reference low voltage are, the lower the compensation resistance value r_Rcp is. The less the compensation resistors connected to the reference low voltage are, the higher the compensation resistance value r_Rcp is. Namely, the compensation resistance value r_Rcp is associated with the number of the turned on switches SW1-SW4. The turned-off switches in the switches SW1-SW4 may float the second terminals of the corresponding compensation resistors. The voltage compensation unit 250 further includes a resistor Rcf. The compensation resistors Rcp1-Rcp4 are respectively coupled to the resistor Rcf in series. In the embodiment, a first terminal of the resistor Rcf is coupled to the power supply PSU. A second terminal of the resistor Rcf is coupled to the first terminals of the compensation resistors Rcp1-Rcp4. The power supply PSU may provide an auxiliary voltage to the first terminal of the resistor Rcf. The voltage compensation unit 250 divides the auxiliary voltage to generate the compensation voltage FBS according to the compensation resistance value r-Rcp and a resistance value of the resistor Rcf, and provides the compensation voltage FBS to the power supply PSU. The power supply PSU compensates the voltage value of the output power Vo according to the compensation voltage FBS.

A cooperative operation of the voltage comparison unit 230, the control circuit 240 and the voltage compensation unit 250 is described below. For example, the voltage comparison unit 230 receives the load voltage VLD, and determines that the load voltage VLD is greater than the reference voltages VR1 and VR2 and smaller than the reference voltages VR3 and VR4. Therefore, the voltage comparison unit 230 may generate the switch control signals SWS1 and SWS2 with the high voltage level and the switch control signals SWS3 and SWS4 with the low voltage level. The control circuit 240 may turn on the switch SW1 according to the switch control signal SWS1 with the high voltage level, turn on the switch SW2 according to the switch control signal SWS2 with the high voltage level, turn off the switch SW3 according to the switch control signal SWS3 with the low voltage level, and turn off the switch SW4 according to the switch control signal SWS4 with the low voltage level. Therefore, the voltage compensation unit 250 may provide the compensation resistance value r_Rcp generated through parallel connection of the compensation resistors Rcp1 and Rcp2. Namely, the voltage compensation unit 250 selects a usage number of the compensation resistors Rcp1-Rcp4 based on the switch control signals SWS1-SWS4 controlling the switches SW1-SW4, so as to provide the compensation resistance value r_Rcp. The voltage compensation unit 250 generates the compensation voltage FBS according to the compensation resistance value r_Rcp, and provides the compensation voltage FBS to the power supply PSU. The power supply PSU compensates the voltage value of the output power Vo according to the compensation voltage FBS.

For another example, when a power demand of the load LD increases, a current value of the load current ILD is also increased. The load voltage VLD is also increased, and the compensation resistance value r_Rcp is decreased. Therefore, the voltage value of the compensation voltage FBS is also decreased. The power supply PSU increases the voltage value of the output power Vo according to the voltage value of the compensation voltage FBS. For another example, when the power demand of the load LD decreases, the current value of the load current ILD is decreased. The load voltage VLD is also decreased, and the compensation resistance value r_Rcp is increased. Therefore, the voltage value of the compensation voltage FBS is also increased. The power supply PSU decreases the voltage value of the output power Vo according to the voltage value of the compensation voltage FBS.

Figure 5:
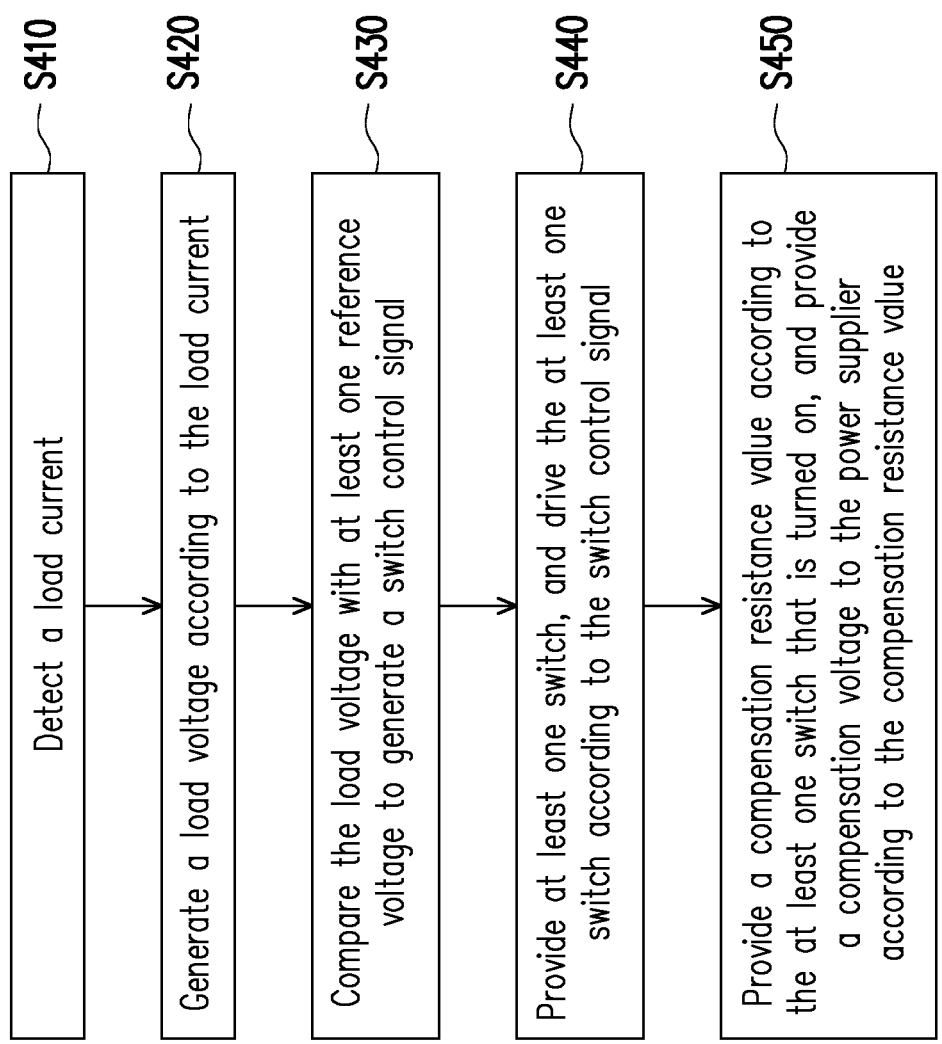
FIG. 5 is a flowchart illustrating a voltage compensation method according to an embodiment of the invention.

Referring to FIG. 1 and FIG. 5, FIG. 5 is a flowchart illustrating a voltage compensation method according to an embodiment of the invention. The voltage compensation method of the embodiment is adapted to compensate the voltage value of the output power Vo of the power supply PSU. In a step S410, the voltage compensation circuit 100 detects the load current ILD provided by the power supply PSU, so as to provide a detection result of the load current ILD. In a step S420, the voltage compensation circuit 100 generates the load voltage VLD according to the load current ILD. Namely, the voltage compensation circuit 100 may convert the detection result of the load current ILD into the load voltage VLD. In a step S430, the voltage compensation circuit 100 compares the load voltage VLD with the reference voltages VR1-VRn to generate the switch control signal SWS. In a step S440, the voltage compensation circuit 100 drives the switches SW1-SWn in internal of the voltage compensation circuit 100 according to the switch control signal SWS. In a step S450, the voltage compensation circuit 100 provides the compensation resistance value r_Rcp according to the turned on switches, and provides the compensation voltage FBS to the power supply PSU according to the compensation resistance value r_Rcp. The power supply PSU provides precise compensation to the output voltage according to the compensation voltage FBS. Enough instructions for implementation details of the steps S410-S450 of the voltage compensation method may be learned from the embodiments of FIG. 1 to FIG. 4, and details thereof are not repeated.

In summary, the voltage compensation circuit and the voltage compensation method of the invention detect the load current provided by the power supply to generate the switch control signal, and drive the switches according to the switch control signal, and provide the compensation resistance value according to the turned on switches. The voltage compensation circuit provides the compensation voltage to the power supply according to the compensation resistance value. Moreover, the voltage compensation circuit detects the load current provided by the power supply on the power transmission line. Therefore, in the invention, the compensation voltage may be dynamically adjusted according to the load current of the power transmission line. In this way, the power supply may provide precise compensation to the output voltage according to the compensation voltage. Compared to the existing improvement method, the invention may detect the load current between the power supply and the load, and when a demand of the load for power increases, the invention may perform precise compensation to the transmission loss between the power supply and the load according to the load current, such that the power supply may output precise output voltage. Therefore, the invention may avoid wrong or inaccurate compensation caused by instability of the feedback of the load side.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A voltage compensation circuit, adapted to compensate a voltage value of an output power of a power supply, the voltage compensation circuit comprising:
a current detection unit, configured to detect a load current provided by the power supply;
a voltage conversion unit, coupled to the current detection unit, and configured to generate a load voltage according to the load current;
a voltage comparison unit, coupled to the voltage conversion unit, and configured to compare the load voltage with at least one reference voltage to generate a switch control signal;
a control circuit, coupled to the voltage comparison unit, comprising at least one switch, and configured to drive the at least one switch according to the switch control signal; and
a voltage compensation unit, coupled to the control circuit, and configured to provide a compensation resistance value according to the at least one switch that is turned on, wherein the voltage compensation unit provides a compensation voltage to the power supply according to the compensation resistance value,
wherein the voltage comparison unit comprises:
a first switch control signal generator, coupled to the voltage conversion unit to receive the load voltage, and configured to compare the load voltage with a first reference voltage of the at least one reference voltage to provide a first switch control signal in the switch control signal to a first switch of the at least one switch; and
a second switch control signal generator, coupled to the voltage conversion unit to receive the load voltage, and configured to compare the load voltage with a second reference voltage of the at least one reference voltage to provide a second switch control signal in the switch control signal to a second switch of the at least one switch,
wherein the first reference voltage and the second reference voltage are generated at a same time, wherein a voltage value of the first reference voltage is different to a voltage value of the second reference voltage.

2. The voltage compensation circuit as claimed in claim 1, wherein:
the current detection unit comprises a detection inductor,
the power supply is configured to provide the output power to a load through the detection inductor, and when a current value of the output power flows through the detection inductor, the detection inductor is configured to provide a load differential signal pair corresponding to the load current.

3. The voltage compensation circuit as claimed in claim 2, wherein the voltage conversion unit comprises:
a differential current amplifier, wherein a first input terminal of differential current amplifier is coupled to a first terminal of the detection inductor and the power supply, a second input terminal of the differential current amplifier is coupled to a second terminal of the detection inductor and the load, wherein the differential current amplifier is configured to convert the load differential pair to generate the load voltage, and output the load voltage through an output terminal of the differential current amplifier.

4. The voltage compensation circuit as claimed in claim 3, wherein the voltage conversion unit further comprises:
a buffer, coupled between the output terminal of the differential current amplifier and the voltage comparison unit, and configured to receive the load voltage and gain a voltage value of the load voltage.

5. The voltage compensation circuit as claimed in claim 1, wherein the first switch control signal generator comprises:

a comparator, having an inverted input terminal configured to receive the reference voltage, and a non-inverted input terminal configured to receive the load voltage; and a reference voltage generator, configured to generate the first reference voltage, and comprising:

a first voltage dividing resistor, having a first terminal coupled to a system power, and a second terminal coupled to the inverted input terminal of the comparator; and a second voltage dividing resistor, having a first terminal coupled to the second terminal of the first voltage dividing resistor, and a second terminal coupled to a reference low voltage.

6. The voltage compensation circuit as claimed in claim 1, wherein the voltage compensation unit comprises:

at least one compensation resistor, respectively coupled to the at least one switch, wherein the voltage compensation unit selects a usage number of the at least one compensation resistor based on the switch control signal controlling the at least one switch, so as to provide the compensation resistance value.

7. The voltage compensation circuit as claimed in claim 6, wherein a first terminal of a first compensation resistor of the at least one compensation resistor is coupled to the power supply, and a second terminal of the first compensation resistor is coupled to a first terminal of a first switch of the at least one switch, a second terminal of the first switch is coupled to a reference low voltage, and a control terminal of the first switch is coupled to the first switch control signal generator to receive the first switch control signal.

8. The voltage compensation circuit as claimed in claim 1, wherein the compensation resistance value is associated with the number of the at least one switch that is turned on.

9. A voltage compensation method, adapted to compensate a voltage value of an output power of a power supply, the voltage compensation method comprising:

detecting a load current provided by the power supply;
generating a load voltage according to the load current;
comparing the load voltage with at least one reference voltage to generate a switch control signal;

providing at least one switch, and driving the at least one switch according to the switch control signal; and providing a compensation resistance value according to the at least one switch that is turned on, and providing a compensation voltage to the power supply according to the compensation resistance value, wherein the step of comparing the load voltage with the at least one reference voltage to generate the switch control signal comprises:

comparing the load voltage with a first reference voltage of the at least one reference voltage to provide a first switch control signal in the switch control signal to a first switch of the at least one switch; and comparing the load voltage with a second reference voltage of the at least one reference voltage to provide a second switch control signal in the switch control signal to a second switch of the at least one switch, wherein the first reference voltage and the second reference voltage are generated at a same time, wherein a voltage value of the first reference voltage is different to a voltage value of the second reference voltage.

10. The voltage compensation method as claimed in claim 9, wherein the step of detecting the load current provided by the power supply comprises:

providing a detection inductor; and
providing a load differential signal pair corresponding to the load current when a current value of the output power flows through the detection inductor.

11. The voltage compensation method as claimed in claim 10, wherein the step of generating the load voltage according to the load current comprises:

converting the load differential signal pair to generate the load voltage.

12. The voltage compensation method as claimed in claim 11, wherein the step of generating the load voltage according to the load current further comprises:

gaining a voltage value of the load voltage.

13. The voltage compensation method as claimed in claim 9, wherein the compensation resistance value is associated with the number of the at least one switch that is turned on.

* * * * *